United States Patent
Burch et al.

(10) Patent No.: US 9,753,457 B2
(45) Date of Patent: *Sep. 5, 2017

(54) FLIGHT MODES AND PROTECTION ENVELOPES BASED ON INERTIAL ATTITUDE ESTIMATES FOR RADIO-CONTROLLED AIRPLANES

(71) Applicant: Horizon Hobby, LLC, Champaign, IL (US)

(72) Inventors: Joseph Burch, Champaign, IL (US); David Ribbe, Mahomet, IL (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,565

(22) Filed: May 11, 2015

(65) Prior Publication Data

US 2015/0241877 A1  Aug. 27, 2015

Related U.S. Application Data

(63) Continuation of application No. 13/900,031, filed on May 22, 2013, now Pat. No. 9,056,667.

(51) Int. Cl.
*B64C 19/00* (2006.01)
*G05D 1/00* (2006.01)
(Continued)

(52) U.S. Cl.
CPC ........... *G05D 1/0022* (2013.01); *A63H 27/02* (2013.01); *A63H 30/04* (2013.01); *B64C 13/16* (2013.01);
(Continued)

(58) Field of Classification Search
CPC .............................. G05D 1/0022; B64C 19/00
See application file for complete search history.

(56) References Cited

U.S. PATENT DOCUMENTS

| 8,473,117 B1 * | 6/2013 | McConville | A63H 27/02 244/12.4 |
| 2005/0151023 A1 * | 7/2005 | Ribbe | A63H 30/04 244/190 |

(Continued)

OTHER PUBLICATIONS

Woo-Kong multi-rotor Manual. Date of Document Jan. 30, 2013. Was accessed on webpage:http://www.aerialtechnology.com/wp-content/uploads/2013/02/WooKong_M_User_Manual_en.pdf on Jan. 16, 2014.*

(Continued)

*Primary Examiner* — Truc M Do
*Assistant Examiner* — Jess Whittington
(74) *Attorney, Agent, or Firm* — Baker Botts L.L.P.

(57) ABSTRACT

The present disclosure describes flight training systems and methods for radio-controlled (RC) airplanes that rely on inertial attitude estimates. Preferred embodiments include an RC airplane with one or more control processors configured to (i) estimate an inertial attitude of the RC airplane based on one or more measurements from an attitude sensor array and (ii) control the inertial attitude of the RC airplane based the inertial attitude estimate. In operation, controlling the attitude of the RC airplane may include both controlling the RC airplane to a specific inertial attitude and/or keeping the inertial attitude of the RC airplane within a predefined flight envelope.

16 Claims, 3 Drawing Sheets

(51) Int. Cl.
  *A63H 30/04*   (2006.01)
  *A63H 27/00*   (2006.01)
  *G05D 1/08*    (2006.01)
  *B64C 13/16*   (2006.01)
  *B64C 39/02*   (2006.01)

(52) U.S. Cl.
  CPC ............ *B64C 19/00* (2013.01); *B64C 39/024* (2013.01); *G05D 1/0033* (2013.01); *G05D 1/0816* (2013.01); *G05D 1/0833* (2013.01)

(56) References Cited

U.S. PATENT DOCUMENTS

| | | | | |
|---|---|---|---|---|
| 2011/0004384 | A1* | 1/2011 | Erickson | B60R 25/00 |
| | | | | 701/70 |
| 2011/0103429 | A1* | 5/2011 | Tanaka | A63H 30/04 |
| | | | | 375/135 |
| 2012/0169484 | A1* | 7/2012 | Rohr | G05D 1/0033 |
| | | | | 340/13.25 |
| 2013/0076494 | A1* | 3/2013 | Isono | G05B 19/042 |
| | | | | 340/12.5 |
| 2013/0309941 | A1* | 11/2013 | Grossman | A63H 33/00 |
| | | | | 446/486 |

OTHER PUBLICATIONS

Specktrum Dx8 Controller Manual. Date of Document is Dec. 30, 2010. Was accessed on webpage:http://www.horizonhobby.com/pdf/SPM8800-Manual_EN.pdf on Jan. 16, 2014.*

FeiYu Tech—FY-30A Flight Stabilization System. Date of Document is Oct. 3, 2011. Was accessed on webpage:https://www.dpcav.com/data_sheets/FY-30A_manual.pdf on Jan. 16, 2014.*

* cited by examiner

FLIGHT MODES AND PROTECTION ENVELOPES BASED ON INERTIAL ATTITUDE ESTIMATES FOR RADIO-CONTROLLED AIRPLANES

FIELD

The disclosed systems and methods relate generally to flight modes and flight protection envelopes based on inertial attitude estimates for radio-controlled (RC) airplanes. Disclosed embodiments focus on flight modes with flight protection envelopes for flight training methods used with fixed-wing RC airplanes.

BACKGROUND

When learning to fly an RC airplane, a new pilot may accidentally pilot the RC airplane into an unintended attitude (roll, pitch, and yaw) that may cause the RC airplane to crash. To alleviate this concern, RC airplane manufacturers have developed RC airplane training systems that attempt to reduce the likelihood of crashes caused by pilot error.

Some prior RC airplane training systems rely upon optical and/or infrared (IR) sensors that monitor the angle of the airplane relative to the horizon, and attempt return the RC airplane to a neutral position relative to the horizon, e.g, by leveling the wings with the horizon (i.e., adjusting the roll) and/or leveling the nose with the horizon (i.e., adjusting the pitch). Other prior airplane training systems rely upon off-axis gyroscopes to keep the wings and/or nose of the RC airplane to within a limited relative angular position.

However, the optical/IR sensors used in prior training systems are affected by certain flight conditions that substantially limit their effectiveness. For example, on overcast days or at dusk, it is more difficult for the optical/IR sensors to discern the horizon. Similarly, flying near reflective surfaces such as bodies of water or reflective roadways or buildings limits the ability of the optical and/or IR sensors to discern the horizon. Additionally, optical/IR sensor-based training systems are largely ineffective (if not wholly ineffective) when flying RC airplanes indoors, e.g., in gymnasiums, indoor stadiums, and other large indoor facilities.

Likewise, prior off-axis gyroscope-based training systems that rely on relative angular position measurements have no inertial knowledge, and thus, are unable to (i) estimate the inertial positioning of the RC airplane, (ii) reliably keep the RC airplane within a particular inertial envelope, or (iii) control the RC airplane to a particular inertial attitude.

SUMMARY

Embodiments of the present invention overcome the limitations of prior RC airplane training systems by (i) estimating an inertial attitude of the RC airplane based on one or more measurements from an attitude sensor array, (ii) using the estimated inertial attitude to command the RC airplane to a specific inertial attitude and/or (iii) using the estimated inertial attitude in combination with inertial-attitude based flight envelopes to keep the RC airplane within a predefined inertial attitude flight envelope.

In contrast to embodiments of the present invention, prior optical/IR and/or off-axis gyroscope based training systems that rely on relative angular positioning have no inertial knowledge, and are therefore unable to command the RC airplane to a specific inertial attitude or to limit the RC airplane to specific inertial attitudes. Because embodiments of the present invention rely on an inertial attitude estimate from a sensor array rather than relative angular positioning determined by optical/IR and/or other sensors, they are not affected (or worst case only nominally affected) in cloudy or overcast weather conditions or when flying near highly reflective objects (e.g., bodies of water, reflective roads and buildings), and they can be used when flying planes indoors (e.g., in large gymnasiums, indoor stadiums, and other large indoor facilities).

Some embodiments include a method of controlling a remote-controlled (RC) airplane that comprises (i) estimating an inertial attitude of the RC airplane based on one or more measurements from an attitude sensor array, and (ii) controlling the RC airplane based on the estimated inertial attitude. Some embodiments include one or more fight modes, wherein each flight mode has a corresponding inertial flight envelope, and where each inertial flight envelope includes a predefined range for an inertial pitch and a predefined range for an inertial roll. In some embodiments, the flight envelope may additionally include predefined ranges for inertial yaw, altitude, airspeed, and/or location.

In some embodiments, the attitude sensor array comprises (i) one or more accelerometers to measure inertial acceleration along each of the roll, pitch, and yaw axes of the RC airplane and (ii) one or more gyroscopes configured to measure angular velocity about the pitch and roll axes of the RC airplane. In some embodiments, the one or more gyroscopes may be configured to additionally measure the angular velocity about the yaw axis of the RC airplane.

In operation, controlling the RC airplane based on the command data and the estimated inertial attitude enables the disclosed embodiments to either or both (i) return the RC airplane to a specific inertial attitude and/or (ii) keep the RC airplane within a predefined inertial attitude flight envelope.

In some embodiments, the pilot may activate a particular flight mode (and its corresponding inertial flight envelope) by depressing a button or activating a switch on a controller associated with the RC airplane. In such embodiments, the pilot has the option of flying the RC airplane in one of a plurality of flight modes, wherein individual flight modes have corresponding flight envelopes.

In preferred embodiments, the RC airplane has four flight modes and three flight envelopes: (i) a "panic" mode that uses a corresponding panic flight envelope, (ii) a "beginner" mode that uses a corresponding beginner flight envelope, (iii) an "intermediate" mode that uses a corresponding intermediate flight envelope, and (iv) an "advanced" mode where no flight envelope is used.

In operation, the pilot may activate the panic mode in situations where the pilot realizes that he or she has piloted the RC airplane into an undesirable attitude that, if uncorrected, may cause the RC airplane to crash. When the pilot activates the panic mode (typically by activating a button or switch on the controller), the RC airplane autonomously flies itself to a specific inertial attitude defined by the panic mode flight envelope. In practice, the specific inertial attitude of the panic mode flight envelope corresponds to an inertial attitude that causes the plane to stabilize itself and fly in a generally circular pattern over the pilot at a safe airspeed and altitude to avoid a crash.

The beginner mode may be desirable when the pilot is learning to fly the RC airplane. Preferably, the flight envelope corresponding to the beginner flight mode includes predefined ranges for at least inertial pitch and inertial roll that are designed to keep the RC airplane within an inertial attitude that substantially reduces the likelihood of a crash. In preferred embodiments, the beginner mode may also include a self-leveling feature where the positioning of the control sticks on the controller correspond to particular inertial attitudes rather than rates of rotation about the roll, pitch, and yaw axes as is typically the case with controllers for RC airplanes. In the beginner flight mode, when the RC airplane determines that it has exceed one or more of the limits defined by the corresponding beginner flight envelope, the RC airplane will control itself to be within the limits defined by the beginner flight envelope so as to prevent (or at least substantially reduce) the pilot's ability to accidentally fly the RC airplane into an unintended attitude.

The intermediate mode may be desirable when the pilot has some comfort level with flying the RC airplane, but may still wish to have the benefit of a flight envelope to reduce the likelihood of crashing the RC airplane. When the intermediate mode is activated, the pilot is able to fly the plane naturally (i.e., without self-leveling) within the limits of the inertial pitch and roll defined by the intermediate mode flight envelope. When the RC airplane determines that it has exceed one or more of the limits defined by the intermediate mode flight envelope, the RC airplane will control itself to be within the limits defined by the intermediate mode flight envelope so as to prevent (or at least reduce) the pilot's ability to accidentally fly the RC airplane into an unintended attitude.

The advanced mode may be desirable when the pilot is comfortable flying the RC airplane. When the advanced mode is activated, the pilot is able to fly the plane normally (i.e., without self-leveling) and without any inertial attitude limits imposed by a flight envelope. However, at any time while flying the RC airplane, the pilot may choose to activate any of the panic, beginner, or intermediate modes to enjoy the safety and benefits (e.g., self-leveling and inertial flight envelopes) provided by each corresponding flight mode.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
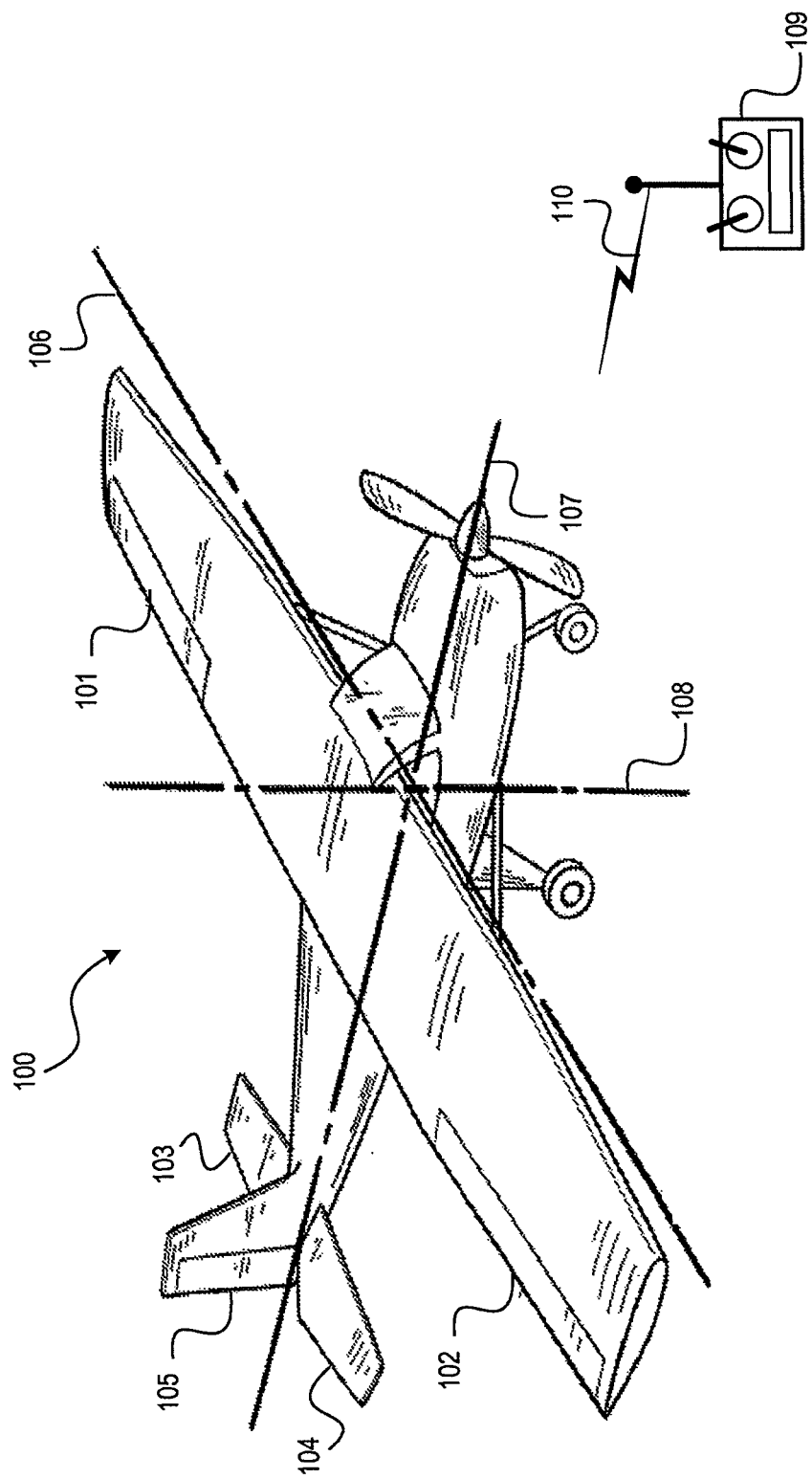
FIG. 1 illustrates an RC airplane according to an example embodiment.
Figure 2:
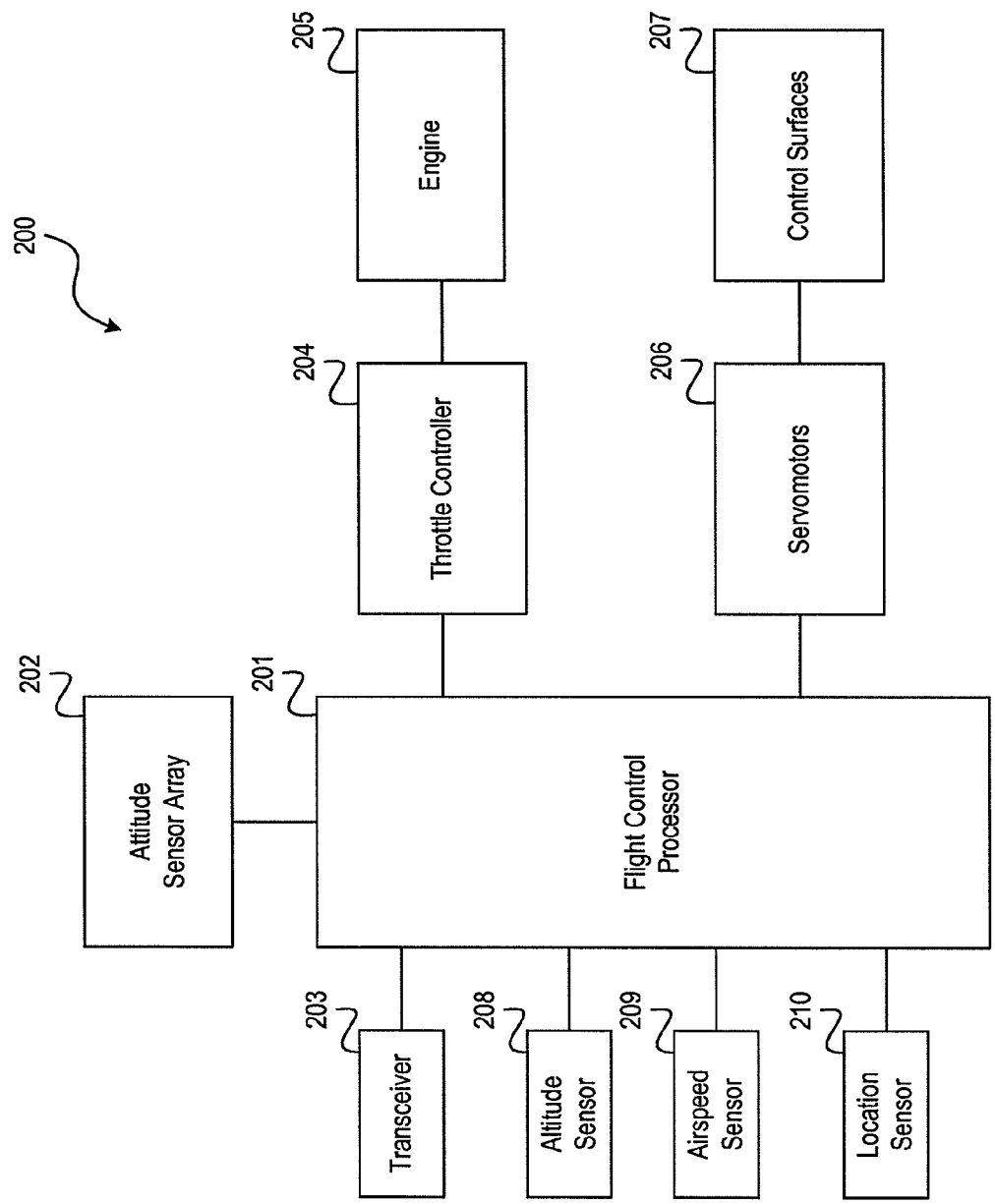
FIG. 2 illustrates a system comprising a flight control processor and an attitude sensor array according to an example embodiment.

FIG. 1 illustrates an RC airplane 100 according to an example embodiment. The RC airplane 100 comprises a plurality of control surfaces 101-105 that are mechanically and/or electrically controlled by a plurality of servomotors 206 (FIG. 2) in response to control signals from a flight control processor 201 (FIG. 2). In operation, the flight control processor 201 generates control signals based at least in part on flight commands received from a controller 109 via an RF link 110 between the controller 109 and the RC airplane 100.

The control surfaces of RC airplane 100 include ailerons 101, 102, elevators 103, 104, and a rudder 105. Other embodiments may include additional or fewer control surfaces. While the specific types and configurations of control surfaces may vary according to the model of RC airplane, the purpose of the control surfaces is the same. In particular, the control surfaces 101-105 control the movements of the RC airplane 100 during flight.

The RC airplane 100 also includes an attitude sensor array 202 (FIG. 2) that sends sensor data to the flight control processor 201 (FIG. 2). The attitude sensor array 202 includes one or more accelerometers and gyroscopes. In preferred embodiments, the sensor array comprises (i) one or more accelerometers configured to measure inertial acceleration along each of the pitch axis 106, roll axis 107, and the yaw axis 108 of the RC airplane 100 and (ii) one or more gyroscopes configured to measure angular velocity about each of the pitch axis 106 and roll axis 107 of the RC airplane 100. In some embodiments, the one or more gyroscopes may be configured to additionally measure angular velocity about the yaw axis 108 of the RC airplane 100. In operation, the flight control processor 201 is configured to estimate an inertial attitude of the RC airplane 100 based on the one or more measurements from the attitude sensor array 202.

FIG. 2 illustrates a system 200 according to an example embodiment. In operation, the system 200 is a component of the RC airplane 100 (FIG. 1). System 200 includes at least a flight control processor 201, an attitude sensor array 202, and a wireless transceiver 203. In some embodiments, the system 200 may additionally include one or more throttle controllers 204, altitude sensors 208, airspeed sensors 209, and/or location sensors 210.

In some embodiments, the functional components of system 200 may be located on a single printed circuit board or alternatively integrated within a single processor. In other embodiments, the components may be located on different printed circuit boards, and/or the functions may be distributed across multiple processors. Additionally, some functional components may be implemented as a single processor or as multiple processors. For example, the flight control processor 201 is shown as a single processor, but the functions of the flight control processor 201 may be performed by one or more processors operating in concert to perform the flight control processor 201 functions described herein.

The attitude sensor array 202 comprises (i) one or more accelerometers configured to measure inertial acceleration along each of the pitch, roll, and yaw axes of the RC airplane and (ii) one or more gyroscopes configured to measure angular velocity about each of the pitch and roll axes of the RC airplane. In some embodiments, the one or more gyroscopes may be configured to additionally measure angular velocity about the yaw axis of the RC airplane. In some embodiments, the accelerometers and the gyroscopes of the attitude sensor array 202 may be implemented as one or more integrated circuits, chips, circuit boards, Micro Electro-Mechanical Systems (MEMS), or any combination thereof. In other embodiments, the accelerometers and gyroscopes may be separate, discrete components. In a preferred embodiment, the accelerometers and gyroscopes of the attitude sensor array 202 are implemented as single integrated circuit component with an output configured to interface with the flight control processor 201. In some embodiments, the attitude sensor array 202 may include an inertial measurement unit configured to provide inertial attitude measurements to the flight control processor 201.

The wireless transceiver 203 is configured to receive command data from the controller 109 (FIG. 1) associated with the RC airplane 100 (FIG. 1), and to provide the command data to the flight control processor 201. The controller 109 includes one or more joysticks, wheels, buttons, and/or switches via which the pilot controls the flight of the RC airplane 100. In operation, the controller 109 translates the pilot inputs into command data that is sent to the RC airplane over the radio-frequency (RF) link 110 (FIG. 1) to the transceiver 203. The command data may include data for controlling the flight of the RC airplane 100 and/or data for activating or deactivating RC airplane features, such as selecting and/or activating/deactivating a selected one or more flight modes as described herein.

The flight control processor 201 is configured to (i) estimate the inertial attitude (pitch, roll, and yaw) of the RC airplane based on data received from the attitude sensor array 202 and (ii) control the inertial attitude of the RC airplane based on the inertial attitude estimate. In operation, controlling the inertial attitude of the RC airplane based on the inertial attitude estimate includes either or both (i) controlling the RC airplane to a particular inertial attitude and/or (ii) keeping the inertial attitude of the RC airplane to within a predefined inertial attitude envelope, also referred to herein as an inertial flight envelope.

In preferred embodiments, the flight control processor 201 estimates the inertial pitch and the inertial roll of the RC airplane based on gyroscope and/or accelerometer data received from the attitude sensor array 202 according to procedures that are known in the art. In some embodiments, the flight control processor 201 may additionally estimate the inertial yaw of the RC airplane based on the accelerometer and gyroscope measurements from the attitude sensor array 202.

The flight control processor 201 is also configured to control the inertial attitude of the RC airplane by sending one or more (i) throttle control signals to a throttle controller 204 to control the engine 205 of the RC airplane, and/or (ii) servomotor control signals to one or more servomotors 206 to manipulate the control surfaces 207, such as control surfaces 101-105 (FIG. 1). In preferred embodiments, the flight control processor 201 is configured to control the flight of the RC airplane based on any one of a set of flight modes, each of which can be activated by the pilot. In some embodiments, one or more of the flight modes may additionally engage a self-leveling functionality. In other embodiments, self-leveling may be engaged and disengaged independent of any particular flight mode. For example, in some embodiments, an RC airplane may have three separate flight modes, each of which may operate with or without self-leveling engaged. In other embodiments, the RC airplane may have three separate flight modes with self-leveling automatically engaged as an aspect one or more of the separate flight modes.

Self-leveling is a capability performed by the flight controller 201 and is based on the inertial attitude estimate. When self-leveling is engaged, the joysticks on the controller 109 map to an inertial attitude of the RC airplane 100 rather than a rate of rotation about a corresponding pitch, roll, or yaw axis of the RC airplane, which is how the RC airplane would ordinarily respond to joystick movements.

Ordinarily, a controller 109 (FIG. 1) associated with the RC airplane has two joysticks—a left joystick and a right joystick. Moving the left joystick up or down increases or decreases the throttle of the engine 205. Moving the left joystick right or left causes the RC airplane to rotate about its yaw axis 108 (FIG. 1), moving the right joystick up or down causes the RC airplane to rotate about its pitch axis 106 (FIG. 1), and moving the right joystick left or right causes the RC airplane to rotate about its roll axis 107 (FIG. 1).

In ordinary operation, when the pilot moves the joystick from its center position to the right, the RC airplane will roll to the right. When the pilot releases the joystick, the joystick will return (spring back) to the center position on the controller 109, but the RC airplane will stay rolled to the right until the pilot moves the joystick to the left of the center position. Thus, after rolling the RC airplane to the right by moving the joystick to the right of its center position, the pilot must move the joystick to the left of its center position to roll the plane back to a level flight position. In other words, the RC airplane does not roll back to a level flight position until the pilot explicitly commands the RC airplane to do so. This characteristic of RC airplane flight is referred to as "natural" flying herein because flying the RC airplane in this manner is substantially similar to flying a full-scale airplane. That is, when flying a full-scale airplane, moving the stick to the right causes the full-scale airplane to roll to the right until the pilot explicitly commands the airplane to roll back to a level flying position by moving the stick to the left of its center position.

Because natural flying mimics the characteristics of full-scale airplanes, natural flying is considered by many RC airplane enthusiasts to be a highly desirable feature. However, for pilots who are new to RC airplanes, natural flying may seem quite unnatural at first because, to use the previous example, the RC airplane continues to roll even after the pilot has released the right joystick of the controller 109 and the joystick of has sprung back to its center position. To some new pilots, the fact that the RC airplane continues to roll absent further input from the controller 109 can be confusing, and in some circumstances, may cause the RC airplane to end up in an unintended inertial attitude that may result in a crash.

The self-leveling capability eliminates (or at least substantially ameliorate) new pilot confusion associated with natural flying by mapping the positions of the joysticks on the controller 109 (FIG. 1) to specific inertial attitudes of the RC airplane rather than to rates of rotation about corresponding pitch, roll, and yaw axes. As a result, when the pilot releases the joystick, and the joystick springs back to its center position, the RC airplane returns to a level inertial attitude. Continuing with the previous example, when the pilot moves the right joystick of the controller 109 to the right, the RC airplane will roll to the right until the pilot the releases the right joystick (causing the joystick to spring back to its center position). When the joystick springs back to its center position, the RC airplane will roll back to a level inertial attitude. Thus, when the pilot senses that he or she is losing control of the airplane, the pilot may simply release the joysticks, and the RC airplane will "level out" and return to a level inertial attitude, thereby hopefully avoiding a crash.

The flight control processor 201 is able to return the RC airplane to a level inertial attitude (i.e., "self-level" the RC airplane) based on the inertial attitude estimate determined from the inputs received from the attitude sensor array 202. RC airplanes without an attitude sensor array 202, or without the ability to otherwise estimate an inertial attitude are not able to self-level themselves to a neutral inertial attitude in this manner. Indeed, prior self-leveling mechanisms based on optical or IR sensors can only level an RC airplane relative to the horizon, which is often unreliable in certain flying conditions or even impossible indoors as previously described, and prior self-leveling mechanisms based on off-axis gyroscopes that measure relative angular position have no inertial knowledge and cannot return the RC airplane to a neutral (or level) inertial attitude.

At least some flight modes also have a corresponding flight envelope. In preferred embodiments, the flight envelope includes a predefined range for the inertial pitch of the RC airplane and a predefined range for the inertial roll of the RC airplane. In such embodiments, the predefined range for the inertial pitch includes a minimum and a maximum pitch angle relative to the pitch axis 106 (FIG. 1) of the RC airplane, and the predefined range for the inertial roll includes a minimum and maximum pitch angle relative to the roll axis 107 (FIG. 1) of the RC airplane. In some embodiments, the flight envelope may also include a predefined range for the inertial yaw of the RC airplane. In such embodiments, the predefined range for the inertial yaw of the RC airplane includes a minimum and maximum yaw angle relative to the yaw axis 108 (FIG. 1) of the RC airplane. In preferred embodiments, different flight modes may have different corresponding flight envelopes with different corresponding predefined ranges for the inertial pitch, roll, and/or yaw of the RC airplane.

In preferred embodiments, the flight control processor 201 controls the RC airplane based on the command data, the estimated inertial attitude, and the inertial attitude limits defined by the flight envelope of the active flight mode. In operation, the flight control processor 201 keeps the RC airplane within the predefined ranges for the inertial pitch and the inertial roll by sending servomotor control signals to the servomotors 206 that operate to adjust the control surfaces, such as control surfaces 101-105 (FIG. 1). The flight control processor 201 may also keep the RC airplane within the predefined ranges for the inertial pitch and inertial roll by additionally sending throttle control signals to the throttle controller 204 for the engine 205 to adjust the airspeed of the RC airplane.

Preferred embodiments include a "panic" flight mode that includes self-leveling and a flight envelope with a very narrow range of values for the inertial pitch and inertial roll of the RC airplane. In operation, the pilot can activate the panic flight mode while the RC airplane is in flight by sending a command to activate the panic mode over the RF link 110 (FIG. 1) from the controller 109 (FIG. 1) to the transceiver 203 of the RC airplane. In some embodiments, when the panic mode is activated, the flight control processor 201 is configured to autonomously fly the RC airplane to a particular inertial attitude within the corresponding flight envelope without further input from the pilot. Autonomously flying the RC airplane to within the flight envelope defined by the panic mode without further input from the pilot has the advantage of eliminating (or at least substantially reducing) the possibility of crashing the RC airplane in situations where the pilot may have inadvertently piloted the RC airplane to an undesirable or even dangerous attitude.

Preferred embodiments also include "beginner" and "intermediate" flight modes. The beginner mode includes self-leveling and a flight envelope with inertial pitch and inertial roll ranges that are wider than the inertial pitch and inertial roll ranges of the flight envelope for the panic flight mode. The intermediate flight mode preferably does not include self-leveling, but does include a flight envelope with inertial pitch and inertial roll ranges that are wider than the inertial pitch and inertial roll ranges of the flight envelope in the panic flight mode. In some embodiments, the inertial pitch and inertial roll ranges for the flight envelope in the intermediate mode are wider than the inertial pitch and inertial roll ranges for the flight envelope in the beginner mode. But in other embodiments, the flight envelopes for the intermediate and beginner flight modes may have the same inertial pitch and inertial roll ranges with the only difference between the beginner and intermediate flight modes being whether flight-leveling is engaged or not.

Preferred embodiments also include one flight mode that does not include either a corresponding flight envelope and where self-leveling is disengaged (i.e., an "advanced" or "expert" mode). When flying the RC airplane in this mode, the flight control processor 201 controls the RC airplane based on the command data received via the transceiver 203 as is known in the art. In some embodiments, an "advanced" or "expert" mode may simply correspond to flying the RC airplane plane without a particular flight mode activated.

In preferred embodiments, the pilot can activate, deactivate, or switch between flight modes before takeoff or during flight. In some embodiments, the flight control processor 201 is configured to activate a particular flight mode in response to receiving a flight mode activation command from the controller 109 (FIG. 1) associated with the RC airplane. In such embodiments, the activation command is sent from the controller 109 over the RF link 110 (FIG. 1) to the transceiver 203 of the RC airplane. The flight mode activation command may correspond to the pilot engaging a button on the controller, setting a switch to a certain position on the controller, or any combination of engaged buttons or switch position settings or other suitable activation mechanisms. But regardless of the timing of the activation or activation mechanism, once a selected flight mode is activated, the flight control processor 201 thereafter controls the RC airplane based on the activated flight mode, which includes a corresponding flight envelope alone or in combination with self-leveling engaged.

In some embodiments, the flight envelope may additionally include a predefined altitude range for the RC airplane that includes a maximum altitude and a minimum altitude. In such embodiments, the system 200 may additionally include an altitude sensor 208 configured to send altitude data to the flight control processor 201. In some embodiments, the altitude sensor 208 may be an air pressure sensor, but any sensor suitable for estimating the altitude of the RC airplane could be used.

In embodiments where the flight envelope additionally includes a predefined altitude range, the flight control processor 201 is configured to estimate the altitude of the RC airplane based on data received from the altitude sensor 208. And the flight control processor 201 is further configured to keep the RC airplane within the predefined altitude range by sending one or both of (i) servomotor control signals to the servomotors 206 to adjust the control surfaces 207, such as control surfaces 101-105 (FIG. 1), and (ii) throttle control signals to the throttle controller 204 for controlling the engine 205.

In further embodiments, the flight envelope may additionally include a predefined airspeed range for the RC airplane that includes a maximum and minimum airspeed. In such embodiments, the system may additionally include an airspeed sensor 209 configured to send airspeed data to the flight control processor 201.

In embodiments where the flight envelope additionally includes a predefined airspeed range, the flight control processor 201 is further configured to estimate the airspeed of the RC airplane based on inputs from the airspeed sensor 209. And the flight control processor 201 is further configured to keep the RC airplane within the predefined airspeed range by sending one or both of (i) servomotor control signals to the servomotors 206 to adjust the control surfaces 207, such as control surfaces 101-105 (FIG. 1), and (ii) throttle control signals to the throttle controller 204 to control the engine 205.

In still further embodiments, the flight envelope may additionally include a predefined location range for the RC airplane that includes a maximum and minimum distance from the RC airplane's take-off point (or another defined location). In such embodiments, the system may additionally include one or more location sensors 210 configured to send location information for the RC airplane to the flight control processor 201. In some embodiments, the one or more location sensors 210 may include a Global Positioning System (GPS) sensor and/or a magnetic compass, but any sensor suitable for estimating the location of the RC airplane could be used as well.

In embodiments where the flight envelope additionally includes a predefined location range, the flight control processor 201 is further configured to estimate the location of the RC airplane based on inputs from the location sensors 210. And the flight control processor 201 is configured to keep the RC airplane within the predefined location range by sending one or both of (i) servomotor control signals to the servomotors 206 to adjust the control surfaces 207, such as control surfaces 101-105 (FIG. 1), and (ii) throttle control signals to the throttle controller 204 to control the engine 205.

Figure 3:
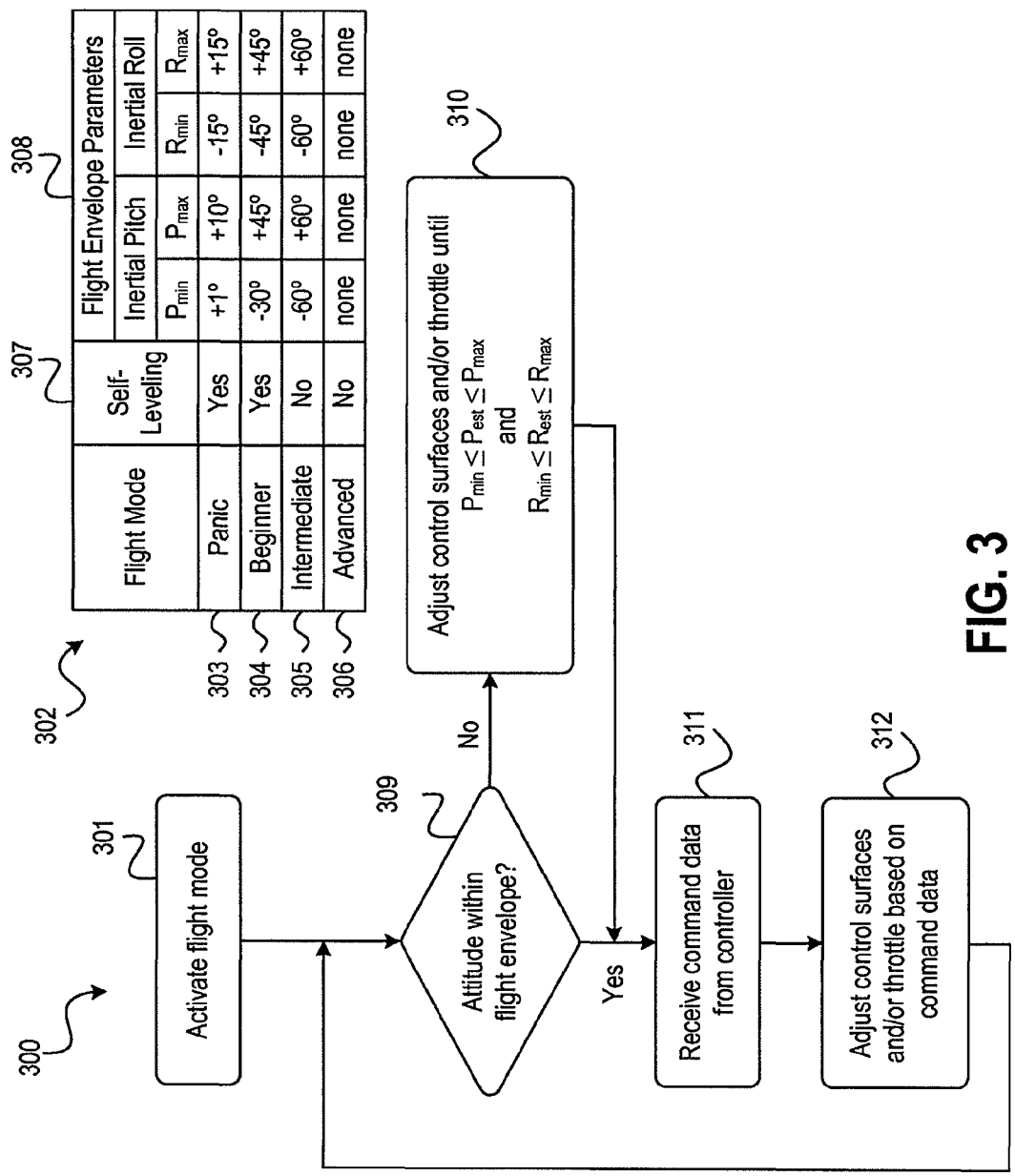
FIG. 3 illustrates a flight control algorithm according to an example embodiment.

FIG. 3 illustrates a flight control algorithm 300 according to an example embodiment. In operation, algorithm 300 is executed by flight control processor 201 (FIG. 2) to control the RC airplane 100 (FIG. 1).

Algorithm 300 begins at block 301 when the pilot activates one of the set of flight modes shown in table 302. Table 302 includes a set of four flight modes: panic mode 303, beginner mode 304, intermediate mode 305, and advanced mode 306. Each flight mode in the table 302 has a self-leveling state (engaged/not engaged) and a corresponding flight envelope.

In operation, the selected flight mode may be activated in response to receiving a flight mode activation command from a controller associated with the RC airplane as describe previously. In algorithm 300, the activated flight mode is one of the four flight modes shown in table 302. However, other embodiments may have fewer or additional flight modes.

Column 307 of table 302 indicates, for each flight mode, whether the flight mode utilizes self-leveling. In the embodiment shown in table 302, the panic 303 and beginner 304 modes utilize self-leveling whereas the intermediate 305 and advanced 306 modes do not utilize self-leveling. As described previously, with self-leveling engaged, the joysticks of the controller map to specific inertial attitude positions, whereas when self-leveling is not engaged, the joysticks map to a rate of rotation about a corresponding axis of the RC airplane (i.e., "natural" flight control).

Column 308 of table 302 indicates the predefined flight envelope parameters corresponding to each flight mode. For the panic mode 303, the predefined flight envelope parameters include (i) an inertial pitch range of +1° to +10° relative to the pitch axis of the RC airplane and (ii) an inertial roll range of −15° to +15° relative to the roll axis of the RC airplane. For the beginner mode 304, the predefined flight envelope parameters include (i) an inertial pitch range of −30° to +45° relative to the pitch axis of the RC airplane and (ii) an inertial roll range of −45° to +45° relative to the roll axis of the RC airplane. For the intermediate mode 305, the predefined flight envelope parameters include (i) an inertial pitch range of −60° to +60° relative to the pitch axis of the RC airplane and (ii) an inertial roll range of −60° to +60° relative to the roll axis of the RC airplane. In table 302, the advanced mode 305 has no predefined ranges for inertial pitch or inertial roll, which in practice may be implemented as either (i) the absence of a flight envelope or (ii) a flight envelope with null values for the maximum and minimum inertial pitch and roll.

In table 302, each of the panic 303, beginner 304, and intermediate 305 flight modes have corresponding predefined ranges for inertial pitch and inertial roll. However, one or more of the panic 303, beginner 304, and intermediate 305 flight modes may additionally have predefined ranges for inertial yaw, altitude, airspeed, and/or location as described previously herein.

After activating a selected flight mode at block 301, algorithm 300 proceeds to block 309 where a determination is made as to whether the current inertial attitude of the RC airplane is within the predefined ranges of the flight envelope corresponding to the active flight mode. In operation, to determine whether the current inertial attitude of the RC airplane is within the predefined ranges of the flight envelope corresponding to the active the flight mode, the flight control processor 201 (i) receives the sensor data from the attitude sensor array 202, (ii) filters the received sensor data for noise, vibration, and other interference, (iii) transforms the filtered sensor data to the RC airplane axes, (iv) estimates the inertial attitude of the RC airplane based on the transformed sensor data, and (v) compares the estimated inertial attitude of the RC airplane with the predefined inertial attitude ranges of the flight envelope corresponding to the active flight mode.

If at block 309 the estimated inertial attitude of the RC airplane is within the predefined ranges of the selected flight envelope, then algorithm 300 proceeds to block 311 to receive command data from the controller and then to block 312 to adjust the control surfaces 101-105 and/or throttle based on the command data. When the estimated inertial attitude of the RC airplane is within the defined limits of the active flight envelope, the flight control processor 201 (FIG. 2) adjusts the control surfaces 207 (FIG. 2) and/or throttle based on flight commands received from the controller 109 (FIG. 1) associated with RC airplane, and the flight control processor 201 need not adjust the control surfaces and/or throttle based on the predefined flight envelope corresponding to the active flight mode.

Because self-leveling is engaged for the panic 303 and beginner 304 flight modes, adjusting the control surfaces and/or throttle based on the command data at block 312 includes controlling the RC airplane to the specific inertial attitude corresponding to the positions of the controller joysticks based on the estimated inertial attitude of the RC airplane. But because self-leveling is not engaged for the intermediate 305 and advanced 306 fight modes, adjusting the control surfaces and/or throttle based on the command data at block 312 includes controlling the rate of rotation about the roll, pitch, and yaw axes of the RC airplane, as is the case with "natural" flight control as described previously.

If at block 309, the flight control processor 201 instead determines that the current attitude of the RC airplane is outside of the predefined ranges of the flight envelope corresponding to the active flight mode, then algorithm 300 proceeds to block 310. At block 310, the flight control processor 201 adjusts the control surfaces and/or the throttle until the inertial attitude of the RC airplane is within the predefined ranges of the flight envelope corresponding to the active flight mode. Once the RC airplane is within the predefined ranges of the flight envelope, the algorithm 300 proceeds to block 311.

At block 311, command data corresponding to one or more flight control commands is received from the controller 109, and algorithm 300 proceeds to block 312. And at block 312, the flight control processor 201 adjusts one or more control surfaces and/or the throttle based on the command data received at block 311. As described earlier, because self-leveling is engaged for the panic 303 and beginner 304 flight modes, adjusting the control surfaces and/or throttle based on the command data at block 312 includes controlling the RC airplane to the specific inertial attitude corresponding to the positions of the controller joystick based on the estimated inertial attitude of the RC airplane. But because self-leveling is not engaged for the intermediate 305 and advanced 306 fight modes, adjusting the control surfaces and/or throttle based on the command data at block 312 includes controlling the rate of rotation about the roll, pitch, and yaw axes of the RC airplane, as is the case with "natural" flight control as described previously.

After adjusting the one or more control surfaces and/or throttle at block 312, algorithm 300 returns to block 309 where a new determination is made as to whether the current attitude of the RC airplane is within the predefined ranges of the flight envelope corresponding to the active flight mode.

Thus, for the intermediate flight mode 305, in instances where the current attitude of the RC airplane is within the predefined limits of the corresponding flight envelope, algorithm 300 enables the pilot to fly the RC airplane naturally (as though there is no envelope activated and without self-leveling engaged). In other words, in the intermediate flight mode 305, algorithm 300 uses the inertial attitude estimate to control the attitude of the RC airplane only when the attitude of the RC airplane is determined to be exceeding the predefined ranges for the inertial pitch and inertial roll of the flight envelope for the intermediate flight mode 305. Otherwise, while the intermediate flight mode 305 is activated, algorithm 300 uses command data to control the attitude of the RC airplane according to the "natural" flight control mechanisms, thereby resulting in a more natural-feeling flight experience for the pilot as compared to previously-described prior training systems.

Having the ability to fly the plane naturally in the intermediate mode 205, but within the limits defined by the flight envelope, is advantageous over prior training systems. In particular, prior training systems continuously operate to return the RC airplane to a neutral position relative to the horizon (or to a particular relative angular position) while the pilot is flying the plane. Because prior training systems continuously operate to bring the RC airplane back to the neural angle relative to the horizon or axis, these systems result in an unnatural flying experience for the pilot and may make it more difficult for the pilot to develop the skill required to fly the RC airplane without the training system engaged. In contrast to prior training systems, while the RC airplane is operating in the intermediate flight mode 205, the pilot is able to fly the plane "naturally" (as though no training system is activated) up until the point where the RC airplane reaches one or more of the limits defined by flight envelope of the intermediate flight mode 305. This ability to fly the RC airplane naturally makes it easier for the pilot to develop the skill required to later fly the RC airplane in the advanced flight mode 306.

While particular aspects and embodiments are disclosed herein, other aspects and embodiments will be apparent to those skilled in the art in view of the foregoing teaching. The various aspects and embodiments disclosed herein are for illustration purposes only and are not intended to be limiting, with the true scope and spirit being indicated by the following claims.

What is claimed is:

1. A radio-controlled (RC) airplane comprising:
   a receiver configured to receive command data corresponding to one or more flight control commands from an RC controller containing a transmitter associated with the RC airplane;
   an attitude sensor array comprising one or more accelerometers and one more gyroscopes;
   a plurality of servomotors configured to adjust one or more control surfaces of the RC airplane; and
   one or more processors configured to (i) estimate an inertial attitude of the RC airplane based on data received from the attitude sensor array, (ii) determine whether the estimated inertial attitude exceeds at least one of a first inertial pitch range or a first inertial roll range corresponding to a first flight envelope of a first flight mode, (iii) in response to determining that the estimated inertial attitude exceeds at least one of the first inertial pitch range or the first inertial roll range, generate at least one control signal for application to at least one of the plurality of servomotors to adjust one or more of the control surfaces; and (iv) in response to receiving command data comprising at least one control stick input, adjusting at least one of a throttle and/or one or more control surfaces of the RC airplane based on an inertial attitude corresponding to the at least one control stick input, wherein the at least one control stick input corresponds to an inertial attitude of the RC airplane rather than a rate of rotation about a corresponding pitch, roll, or yaw axis of the RC airplane.

2. The RC airplane of claim 1, wherein the first inertial pitch range comprises a minimum inertial pitch angle and a maximum inertial pitch angle, and wherein the first inertial roll range comprises a minimum inertial roll angle and a maximum inertial roll angle.

3. The RC airplane of claim 2, further comprising:
   an engine and a throttle control configured to control a speed of the engine;
   at least one altitude sensor, and wherein the first flight envelope further comprises a minimum altitude and a maximum altitude; and
   wherein the one or more processors are further configured to (i) determine whether the RC airplane has either exceeded the maximum altitude or fallen below the minimum altitude, and (ii) in response to determining that the RC airplane has either exceeded the maximum altitude or fallen below the minimum altitude, generate at least one control signal for application to at least one of (a) the throttle control to adjust the speed of the engine or (b) at least one of the plurality of servomotors to adjust one or more of the control surfaces.

4. The RC airplane of claim 2, further comprising:
   an engine and a throttle control configured to control a speed of the engine;
   at least one airspeed sensor, and wherein the first flight envelope further comprises a minimum airspeed and a maximum airspeed; and
   wherein the one or more processors are further configured to (i) determine whether the RC airplane has either exceeded the maximum airspeed or fallen below the minimum airspeed, and (ii) in response to determining that the RC airplane has either exceeded the maximum airspeed or fallen below the minimum airspeed, generate at least one control signal for application to the throttle control to adjust the speed of the engine.

5. The RC airplane of claim 2, further comprising:
at least one location sensor, and wherein the first flight envelope further comprises a maximum distance between the RC airplane and a predetermined location; and
wherein the one or more processors are further configured to (i) determine whether the RC airplane has exceeded the maximum distance from the predetermined location and (ii) in response to determining that the RC airplane has exceeded the maximum distance from the predetermined location, generate at least one control signal for application to at least one of (a) the throttle control to adjust the speed of the engine or (b) at least one of the plurality of servomotors to adjust one or more of the control surfaces.

6. The RC airplane of claim 1, wherein the first flight envelope further comprises an inertial yaw range comprising a minimum inertial yaw angle and a maximum inertial yaw angle; and
wherein the one or more processors are further configured to (i) determine whether the RC airplane has exceeded the inertial yaw range, and (ii) in response to determining that the RC airplane has exceeded the inertial yaw range, generate at least one control signal for application to at least one of the plurality of servomotors to adjust one or more of the control surfaces.

7. The RC airplane of claim 1, wherein the one or more processors are further configured to activate the first flight mode of the plurality of flight modes in response to receiving a flight mode activation command from an RC controller associated with the RC airplane.

8. The RC airplane of claim 1, wherein the first flight mode is one of a plurality of flight modes comprising:
a panic flight mode comprising a panic flight envelope having corresponding ranges for inertial pitch and inertial roll;
the first flight mode, wherein the first inertial pitch range and the first inertial roll range of the first flight envelope are wider than the corresponding inertial pitch and inertial roll ranges for the panic flight mode; and
a second flight mode comprising a second flight envelope having a second inertial pitch range that is wider than the first inertial pitch range of the first flight envelope of the first flight mode and a second inertial roll range that is wider than the first inertial roll range of the first flight envelope of the first flight mode.

9. A flight control unit for a radio-controlled (RC) airplane comprising:
a receiver configured to receive command data corresponding to one or more flight control commands from an RC controller containing a transmitter associated with the RC airplane;
an attitude sensor array comprising one or more accelerometers and one more gyroscopes; and
one or more processors configured to (i) estimate an inertial attitude of the RC airplane based on data received from the attitude sensor array, (ii) determine whether the estimated inertial attitude exceeds at least one of a first inertial pitch range or a first inertial roll range corresponding to a first flight envelope of a first flight mode, (iii) in response to determining that the estimated inertial attitude exceeds at least one of the first inertial pitch range or the first inertial roll range, generate at least one control signal for application to at least one of a plurality or servomotors to adjust one or more of the control surfaces, wherein the plurality of servomotor are configured to adjust one or more control surfaces of the RC airplane; and (iv) in response to receiving command data comprising at least one control stick input, adjusting at least one of a throttle and/or one or more control surfaces of the RC airplane based on an inertial attitude corresponding to the at least one control stick input, wherein the at least one control stick input corresponds to an inertial attitude of the RC airplane rather than a rate of rotation about a corresponding pitch, roll, or yaw axis of the RC airplane.

10. The flight control unit of claim 9, wherein the first inertial pitch range comprises a minimum inertial pitch angle and a maximum inertial pitch angle, and wherein the first inertial roll range comprises a minimum inertial roll angle and a maximum inertial roll angle.

11. The flight control unit of claim 10, further comprising:
at least one altitude sensor,
wherein the first flight envelope further comprises a minimum altitude and a maximum altitude; and
wherein the one or more processors are further configured to (i) control a speed of an engine via a throttle control, (ii) determine whether the RC airplane has either exceeded the maximum altitude or fallen below the minimum altitude, and (iii) in response to determining that the RC airplane has either exceeded the maximum altitude or fallen below the minimum altitude, generate at least one control signal for application to at least one of (a) the throttle control to adjust the speed of the engine or (b) at least one of the plurality of servomotors to adjust one or more of the control surfaces.

12. The flight control unit of claim 10, further comprising:
at least one airspeed sensor,
wherein the first flight envelope further comprises a minimum airspeed and a maximum airspeed; and
wherein the one or more processors are further configured to (i) control a speed of an engine via a throttle control, (ii) determine whether the RC airplane has either exceeded the maximum airspeed or fallen below the minimum airspeed, and (iii) in response to determining that the RC airplane has either exceeded the maximum airspeed or fallen below the minimum airspeed, generate at least one control signal for application to the throttle control to adjust the speed of the engine.

13. The flight control unit of claim 10, further comprising:
at least one location sensor, and wherein the first flight envelope further comprises a maximum distance between the RC airplane and a predetermined location; and
wherein the one or more processors are further configured to (i) determine whether the RC airplane has exceeded the maximum distance from the predetermined location and (ii) in response to determining that the RC airplane has exceeded the maximum distance from the predetermined location, generate at least one control signal for application to at least one of (a) the throttle control to adjust the speed of the engine or (b) at least one of the plurality of servomotors to adjust one or more of the control surfaces.

14. The flight control unit of claim 9, wherein the first flight envelope further comprises an inertial yaw range comprising a minimum inertial yaw angle and a maximum inertial yaw angle; and
wherein the one or more processors are further configured to (i) determine whether the RC airplane has exceeded the inertial yaw range, and (ii) in response to determining that the RC airplane has exceeded the inertial yaw range, generate at least one control signal for application to at least one of the plurality of servomotors to adjust one or more of the control surfaces.

15. The flight control unit of claim 9, wherein the one or more processors are further configured to activate the first flight mode of the plurality of flight modes in response to receiving a flight mode activation command from an RC controller associated with the RC airplane.

16. The flight control unit of claim 9, wherein the first flight mode is one of a plurality of flight modes comprising:
   a panic flight mode comprising a panic flight envelope having corresponding ranges for inertial pitch and inertial roll;
   the first flight mode, wherein the first inertial pitch range and the first inertial roll range of the first flight envelope are wider than the corresponding inertial pitch and inertial roll ranges for the panic flight mode; and
   a second flight mode comprising a second flight envelope having a second inertial pitch range that is wider than the first inertial pitch range of the first flight envelope of the first flight mode and a second inertial roll range that is wider than the first inertial roll range of the first flight envelope of the first flight mode.

* * * * *